United States Patent [19]
Childers et al.

[11] 3,789,084
[45] Jan. 29, 1974

[54] BLENDS OF STYRENE/ACRYLONITRILE COPOLYMERS WITH BLOCK COPOLYMERS CONTAINING LACTONES AND A RESINOUS OR RUBBERY POLYMER

[75] Inventors: Clifford W. Childers; Earl Clark, both of Bartlesville, Okla.

[73] Assignee: Phillips Petroleum Company, Bartlesville, Okla.

[22] Filed: Oct. 4, 1971

[21] Appl. No.: 186,433

Related U.S. Application Data

[63] Continuation-in-part of Ser. No. 29,687, April 17, 1970, Pat. No. 3,649,716.

[52] U.S. Cl.............. 260/873, 260/880 B, 260/892, 260/893

[51] Int. Cl............................................. C08q 39/10

[58] Field of Search......... 260/873, 893, 892, 880 B

[56] References Cited
UNITED STATES PATENTS

| | | | |
|---|---|---|---|
| 3,649,716 | 3/1972 | Childers et al...................... | 260/873 |
| 3,652,720 | 3/1972 | Wright................................ | 260/876 |
| 3,641,200 | 2/1972 | Matzner............................. | 260/860 |

Primary Examiner—William H. Short
Assistant Examiner—Edward Woodberry
Attorney, Agent, or Firm—Young & Quigg

[57] ABSTRACT

The impact strength of styrene/acrylonitrile copolymers is greatly improved by blending therewith a conjugated diene block copolymer containing a lactone and a resinous or rubbery polymer.

9 Claims, No Drawings

BLENDS OF STYRENE/ACRYLONITRILE COPOLYMERS WITH BLOCK COPOLYMERS CONTAINING LACTONES AND A RESINOUS OR RUBBERY POLYMER

This is a continuation-in-part of copending application Ser. No. 29,687, filed Apr. 17, 1970 now U.S. Pat. No. 3,649,716.

This invention relates to a method for improving the impact strength of styrene/acrylonitrile copolymers. This invention further relates to a novel compositin comprising a blend of styrene/acrylonitrile copolymers and a conjugated diene block copolymer containing a lactone wherein said lactone block forms a solid solution with said styrene/acrylonitrile copolymer.

A method has now been discovered for greatly improving the impact strength of resinous styrene/acrylonitrile copolymers while essentially maintaining or improving other important properties of the copolymer such as flexural modulus, tensile, and elongation. It has thus been surprisingly discovered that the impact strength of styrene/acrylonitrile copolymers is greatly improved by blending therewith a conjugated diene block copolymer containing a lactone.

A novel homogeneous polymer mixture has also been discovered in that it has been found that there is a true solubility between styrene/acrylonitrile copolymers and the lactone segment of said block copolymers.

Our invention is particularly surprising in view of the fact that the impact strength of styrene/acrylonitrile copolymers is greatly improved only when the lactone polymer that is blended therewith is in the form of a block copolymer containing said lactone in contrast to a polylactone such as a lactone homopolymer. Said lactone homopolymers, even at high concentrations and in spite of appearing to be completely compatible therewith, were comparatively ineffective for improving the impact strength of the styrene/acrylonitrile copolymers. Our invention is completely unexpected in that blends of styrene/acrylonitrile copolymers with other polymers such as polybutadiene and rubbery butadiene/styrene copolymers were also comparatively ineffectual for improving the impact strength of styrene/acrylonitrile copolymers. Another startling fact is that when said lactone block copolymers are blended with other resinous polymers such as polystyrene or polymethylmethacrylate great improvements in the impact strength are not realized.

According to our invention, conjugated diene block copolymers, containing from about 5 to 80, preferably 10 to 50, weight percent lactone, based on the total monomeric composition of said conjugated diene block copolymer, are employed to impart great improvements in the impact strength of styrene/acrylonitrile copolymers by admixing said conjugated diene/lactone block copolymer and said styrene/acrylonitrile copolymer to form a blend composite.

Further, rubbery polymers such as polybutadiene, butadiene/styrene copolymers, ethylene/proylene/diene copolymers, sulfur vulcanizable alkene oxide polymers, and the like, as well as resinous polymers, such as polycarbonates, can also be employed in admixture with the styrene/acrylonitrile copolymers and conjugated diene/lactone block copolymer in preparing the blends of this invention and yet essentially maintained the imparted impact strength to the styrene/acrylonitrile copolymer provided by the conjugated diene/lactone block copolymer.

The lactone containing block copolymers of this invention are employed in an amount sufficient to provide from about 5 to 60, perferably 10 to 50, weight percent of said lactone containing block copolymer based on the total weight of the blend composition.

When the remaining blend component is essentially the styrene/acrylonitrile copolymer, it is thus employed in an amount sufficient to provide from about 95 to 40, preferably 90 to 50, weight percent of said styrene/acrylonitrile copolymer based on the total weight of blend. When other rubbery or resinous polymers are employed in admixture with the styrene/acrylonitrile copolymer and the lactone containing block copolymer, the styrene/acrylonitrile copolymer will represent from about 40 to 95 weight percent of the total weight of the blend composition and the lactone containing block polymer at least 5, preferably 5.6 to 20.2, weight percent of the total weight of the blend composition and said other rubbery or resinous polymer will represent not more than 50, preferably 1.7–50, weight percent of the total weight of the blend composite.

The blending of the various components of this invention can be accomplished by any convenient method known to the art with a preferred method employing a Brabender Plastograph. A primary desired result being an intimate mixture of the components. The blends of this invention can be formed with or without the use of peroxy compounds as curing agents. The polymers employed according to this invention are thus formed into a blend together with a peroxy compound, if employed, and the blend subjected to heating either during or after blending, or both, at a temperature at or above that which causes decomposition of the peroxy compound if one is employed. Thus, the temperature and time employed in the blending step will, in general, depend upon the choice of blend components and, the presence or absence of a peroxy compound, but these conditions will at least be sufficient to provide said intimate mixture of all of the blend components and to decompose the peroxy compound if one is employed.

The peroxy compounds which can be employed in this invention include organic and inorganic peroxides. The term "organic peroxides" is meant to include the hydroperoxides, unless otherwise stated, and to encompass compounds containing from four to 40 carbon atoms per molecule, inclusive. The organic peroxides can also be substituted with non-peroxy members such as halogen, hydroxy radicals, ether and/or ester linkages, and the like. The inorganic peroxides include calcium peroxide, barium peroxide, zinc peroxide, lead peroxide, and mixtures thereof.

Examples of suitable peroxides include: methyl n-propyl peroxide, diethyl peroxide, ethyl isopropyl peroxide, di-tert-butyl peroxide, di-n-hexyl peroxide, n-hexyl n-decyl peroxide, dieicosyl peroxide, dicyclohexyl peroxide, dicyclopentyl peroxide, bis(2,4,6-trimethylcyclohexyl) peroxide, bis(3,5-dichlorocyclohexyl) peroxide, bis(4-phenylcyclohexyl) peroxide, bis(2-cyclohexenyl) peroxide, bis(4-methyl-2-hexenyl) peroxide, bis(4-octenyl) peroxide, dipropionyl peroxide, dilauroyl peroxide, dibenzoyl peroxide, dicrotonyl peroxide, dibenzyl peroxide, bis(alpha,alpha-dimethyl benzyl) peroxide, methyl 2-n-propyl-3-butenyl peroxide, bis(alpha-ethyl-benzyl) peroxide, bis[diisopropyl-(4-isopropylphenyl)methyl] peroxide, bis[dimethyl(4-tert-butylphenyl)methyl] peroxide, benzyl alpha-methylbenzyl peroxide, bis[4-chlorobenzoyl] peroxide, bis(2,4-dichlorobenzoyl) peroxide, bis(2-propoxy-n-hexyl) peroxide, n-pentyl 5,8-diphenyldodecyl peroxide, bis (9,10-dihydroxydecyl) peroxide, 2,5-di(tert-butylperoxy)-2,5-dimethylhexane, bis(2-hydroxyheptyl) peroxide, tert-butyl hydroperoxide, dodecyl hydroperoxide, eicosyl hydroperoxide, triacontanyl hydroperoxide, 4-methylcyclohexyl hrdroperoxide, phenylcyclohexane hydroperoxide, 3-cyclohexenyl hydroperoxide, 3-phenyl-2-cyclohexenyl hydroperoxide, 4-cyclopentyl-n-butyl hydroperoxide, cumene hydroperoxide (dimethylphenylhydroperoxymethane), diisopropylbenzene hydroperoxide[dimethyl-(4-isopropylphenyl)hydroperoxymethane], (4-ethoxyphenyl)methyl hydroperoxide, di-n-hexyl-4-hydroxyphenylhydroperoxymethane, dimethyl(3-methoxyphenyl)hydroperoxymethane, peroxybenzoic acid, peroxybutyric acid, peroxydodecanoic acid, tert-butyl peroxybenzoate, di-tert-amyl diperoxyphthalate, and tert-dodecyl peroxyacetate.

Peroxides formed by the oxidation of terpene hydrocarbons such as pinane, alpha-pinene, p-methane, and turpentine can also be used.

The peroxides which are preferred in this invention are those which decompose at a temperature of at least 250° F.

The amount of peroxy compound, or compounds, employed according to this invention is that which will provide from about 0.25 to about 6, preferably from about 0.35 to about 4.5 gram millimoles of peroxy oxygen (—O—O—) per 100 grams of polymers in the composition.

Styrene/acrylonitrile copolymers that can be employed according to this invention contain from about 5 to 50, preferably 15 to 40, weight percent acrylonitrile, with the remaining weight percent being styrene, based on the total weight of the monomers employed in preparing the resinous styrene/acrylonitrile copolymer. The styrene/acrylonitrile copolymer can be prepared by any convenient method known to the art such as disclosed in U. S. Pat. No. 2,739,142.

The conjugated diene block copolymers containing the lactone, which are employed to impart great improvements in the impact strength of styrene/acrylonitrile copolymers, can be broadly represented by the formula A-B, wherein A represents a block or polymer segment comprising polymerized conjugated diene and B represents a block or polymer segment comprising polymerized lactones. The B block comprises homopolymers of lactones or copolymers of two or more lactones and said lactone block or segment commprises from about 5 to 80, preferably 10 to 50, weight percent of the total weight of said conjugated diene block copolymer. The A block thus comprises the remaining 95 to 20 weight percent of said conjugated diene block copolymer, and said A segment comprises homopolymer prepared from conjugated dienes, copolymers prepared from two or more conjugated dienes, or copolymers prepared from conjugated diene and monovinyl-substituted aromatic hydrocarbons. When the A segment comprises a copolymer in conjugated dienes and monovinyl-substituted aromatic hydrocarbons it is preferred that sufficient conjugated diene monomer be employed to provide a minimum of 10 weight percent of polymerized conjugated diene based on the total weight of said conjugated diene block copolymer. When the A block is a copolymer of conjugated diene and monovinyl-substituted aromatic hydrocarbons these monomers can be combined in a random or block manner. Thus, for example, the lactone polymer segment B can be attached to the block A at a polymerized diene segments or a polymerized monovinyl-substituted aromatic hydrocarbon segment.

Conjugated dienes containing from about four to 12 carbon atoms per molecule and monovinyl-substituted aromatic hydrocarbons containing from about eight to 12 carbon atoms per molecule can be employed for preparing the lactone-containing block copolymers employed according to this invention.

Suitable conjugated dienes include 1,3-butadiene, isoprene, piperylene, 6-phenyl-1,3-hexadiene, and the like. Suitable monovinyl-substituted aromatic hydrocarbon compounds include styrene, alpha-methyl styrene, 4-methyl styrene, 4-isopropyl styrene, 2,4-dimethyl styrene, 1-vinylnaphthalene, 2-vinylnaththalene, alkyl derivatives thereof, and the like.

Lactone monomers that can be employed according to this invention in preparing said conjugated diene block copolymer containing said lactone can be represented by the following formula:

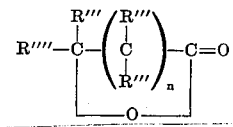

wherein R'''' is one of hydrogen and a radical of the formula

and when R'''' is a radical as specified no R''' is attached to the carbon atom to which the radical is attached, wherein R''' is one of hydrogen, alkyl, cycloalkyl, alkenyl, cycloalkenyl and aryl and combinations thereof such as alkylaryl, wherein the total carbon atoms in the R''' and R'''' substituents being in the range of 1 to 12, and wherein n being an integer which can be 1, 3, or 4.

Suitable lactones include beta-propiolactone, delta-valerolactone, epsilon-caprolactone, and lactones corresponding to the following acids: 2-methyl-3-hydroxypropionic acid, 3-hydroxynonanoic or 3-hydroxypelargonic acid, 2-dodecyl-3-hydroxypropionic acid, 2-cyclopentyl-3-hydroxypropionic acid, 3-phenyl-3-hydroxypropionic acid, 2-(1-naphthyl)-3-hydroxypropionic acid, 2-n-butyl-3-cyclohexyl-3-hydroxypropionic acid, 2-phenyl-3-hydroxytridecanoic acid, 2-(2-methylcyclopentyl)-3-hydroxypropionic acid, 2-(2-methylphenyl)-3-hydroxypropionic acid, 3-benzyl-3-hydroxypropionic acid, 2,2-dimethyl-3-hydroxypropionic acid, 2-methyl-5-hydroxyvaleric acid, 3-cyclohexyl-5-hydroxyvaleric acid, 4-phenyl-5-hydroxyvaleric acid, 2-heptyl-4cyclopentyl-5-hydroxyvaleric acid, 2-methyl-3-phenyl-5- hydroxyvaleric acid, 3-(2-cyclohexylethyl)-5-hydroxyvaleric acid, 2-(2-phenylethyl)-4-(4-cyclohexylbenzyl)-5-hydroxyvaleric acid, 4-benzyl-5-hydroxyvaleric acid, 3-ethyl-5-isopropyl-6-hydroxycaproic acid, 2-cyclopentyl-4-hexyl-6-hydroxycaproic acid, 3-phenyl-6-hydroxycaproic acid, 3-(3,5-diethylcyclohexyl)-5-ethyl-6-hydroxycaproic acid, 4-(3-phenylpropyl)-6-hydroxycaproic acid, 2-benzyl-5-isobutyl-6-hydroxycaproic acid, 7-phenyl-6-hydroxy-6-octenoic acid, 2,2-di(1-cyclohexenyl)-5-hydroxy-5-haptenoic acid, 2,2-di-1-propenyl-5-hydroxy-5-heptenoic acid, 2,2-dimethyl-4-(1-propenyl)-3-hydroxy-3,5-heptadienoic acid, and the like.

The conjugated diene/lactone block copolymer as herein described can be prepared by any convenient method known to the art. Preferred processes are fully detailed in U. S. Patent Application, Ser. No. 883,986 by Floyd E. Naylor entitled LACTONE COPOLYMERS, filed Dec. 10, 1969, now U. S. Pat. No. 3,598,799. Said patent application is herein incorporated by reference thereto. Any of the methods disclosed in said patent application for preparing the lactone containing block copolymers can be employed according to this invention, subject of course to any limitation herein set forth.

As disclosed in said patent application by Floyd E. Naylor, the preferred polymerization initiators for the foregoing monomeric materials in preparing the conjugated diene block copolymer containing the lactone are the organoalkali metal polymerization initiators, and more preferably organolithium initiators. Representative of preferred polymerization initiators are, of course, methyllithium, isopropyllithium, n-butyllithium, sec-butyllithium, phenyllithium, dilithiomethane, and the like. Polymerization procedures employing the above monomers and initiators are fully disclosed in said patent application and therefore, are not in detail described here.

The blend composites provided by this invention display high impact strengths with a good balance of other properties including resistance to cooking oils. The blends of this invention can also contain other ingredients normally included with such polymers such as antioxidants, pigments, dyes, fillers, stabilizers, plasticizers, and the like.

Polymeric composites produced according to this invention are useful for lining refrigerators, making molded and extruded containers, cartons, bowls, and the like. Blends of this invention have properties comparable to commercially available ABS polymers but have a lower ash content and are lighter in color than many of the ABS materials.

In addition to the above-described features of the blend composites of this invention, certain of the blend composites provided by this invention display transparency along with high impact strength. Such a combination of properties is of course highly desirable such as in packaging applications where thermoplastic materials are desired.

It is well recognized that the opacity of commercial ABS polymers is due to light scattering from the interfaces of the multi-phase system present in such materials. It is also known that a reduction in particle size of the dispersed phase(s) below that of the wavelengths of visible light reduces the opacity of such blends but produces no improvement in the physical properties of the brittle component of said blends, i.e., no reinforcement effects are obtained. However, essentially transparent impact plastic compositions of this invention can be obtained by closely matching the refractive indices of the phases in said blends, i.e., the two phases are believed to be the ($a$) lactone block with said styrene/acrylonitrile copolymer, and ($b$) the remainder of the lactone block polymer. That this technique can be employed with blends of this invention to produce essentially transparent compositions is particularly surprising in that it was found that a number of lactone block polymers all had refractive indices lower than the styrene/acrylonitrile copolymer employed in preparing the blends. Since it is believed that the lactone block of the conjugated diene block copolymer containing said lactone block formed a solution with the styrene/acrylonitrile copolymer then the refractive index of this solid solution and that of the remainder of the lactone-containing block polymer could be calculated and shown to be closely matched for those blends of this invention which are essentially transparent. The above calculations were made by assuming that a linear relationship between the composition of the copolymers and their refractive indices based on the refractice indices of the responsive homopolymers existed. The success of these assertions provides additional strong evidence regarding the true compatibility of the lactone block in the lactone-containing block polymers with the styrene/acrylonitrile copolymer.

Illustrative of the foregoing discussion and not to be interpreted as a limitation on the scope thereof, or on the materials herein employed, the following examples are presented.

EXAMPLE I

Various polymer blends were prepared to demonstrate the ability of the lactone containing block copolymers of this invention to greatly improve the impact strength of styrene/acrylonitrile copolymers and to further demonstrate the comparative ineffectuality of various other rubbers to achieve the same results.

Thus, blends were prepared from various rubbery polymers and/or styrene/butadiene/epsilon-caprolactone block polymers with styrene/acrylonitrile resin. The procedure employed in these runs was to measure the properties of the blends in which the rubbery polymer was used to replace various proportions, or all of the lactone-containing block polymer, in the blends while maintaining the sum of the butadiene plus lactone content in the blends at a constant level in an attempt to maintain the flexural modulus at an essentially constant value in order to more clearly see the effect of the lactone block segment on the impact strength of the blends.

The blends were prepared by the use of a Brabender Plastograph internal mixer in which the mixing chamber was first heated to 145° C. by means of an oil bath. The mixing chamber was then purged with nitrogen. The polymers added to the chamber were then fluxed together in a nitrogen atmosphere while the rotors of the mixing head were rotated at about 10 revolutions per minute (rpm). The fluxed mass was then mixed at 100 rpm for 3 minutes in a nitrogen atmosphere. 0.1 Parts by weight of bis(alpha,alpha-dimethylbenzyl)-peroxide, i.e., Dicup, was added to each blend after the mixer was slowed to about 10 rpms and a vacuum applied to the mixing chamber. When the vacuum was equivalent to 30 inches of mercury the mass was mixed for 7 minutes at 100 rpm.

These specimens were then prepared by compression molding the blends of 350° F. under about 1,100 pounds/square inch pressure. The procedure used was to preheat the sample under slight mold pressure for about 4 minutes then at about 1,100 lbs/sq. in. for about 4 minutes longer. The blend composition and properties of the blends are reported in Table I.

The results reported in Table I clearly demonstrate the impact strength of the styrene/acrylonitrile copolymer is greatly improved by the admixture of the lactone containing block copolymer. The styrene/acrylonitrile copolymer is very sensitive to the presence of said lactone containing block copolymer and the impact strength thereof falls off to a very low value when no lactone- containing block copolymer is present. It should be noted that only comparative slight increases in impact strength of the styrene/acrylonitrile copolymers are obtained by admixture of rubbery polymers not containing said lactone. It should also be noted that the impact strengths demonstrated by the blends of this invention are among the highest known for impact plastics of any type.

EXAMPLE II

Blends were made according to the process of Example I to demonstrate the ability of a lactone polymer to greatly improve the impact strength of a styrene/acrylonitrile copolymer if said lactone is employed as a block copolymer containing said lactone in contrast to a lactone homopolymer. Accordingly, in Runs 1, 4, and 6, the styrene/acrylonitrile copolymer was blended with a lactone containing block copolymer according to this invention. In the remaining runs of styrene/acrylonitrile copolymer was blended with polycaprolactone homopolymer and butadiene/styrene block copolymers to provide an equivalent percentage or greater of lactone to the styrene/acrylonitrile copolymer. The blend composition and properties of the blends are reported in Table II.

TABLE II

| Run number | SAN, parts [a] | Block polymer, parts [a] | Polycaprolactone, parts [a] [i] | Melt flow, g./10 min. | Flexural modulus, p.s.i. | Tensile, p.s.i. | Elongation, p.s.i. | Izod impact, ft.-lb./in. notch |
|---|---|---|---|---|---|---|---|---|
| 1 | [j] 77.5 | [b] 22.5 | | 0.21 | 297,000 | 5,250 | 54 | 11.62 |
| 2 | 77.5 | 16.9 | 5.6 | 1.60 | 344,000 | 5,050 | 21 | 0.64 |
| 3 | 77.5 | [d] 16.9 | 5.6 | 1.87 | 307,000 | 4,570 | 21 | 0.69 |
| 4 | 67.3 | [e] 32.7 | | 0.15 | 296,000 | 4,880 | 45 | 7.54 |
| 5 | 67.3 | [f] 24.5 | 8.2 | 1.95 | 302,000 | 4,090 | 39 | 0.84 |
| 6 | 85 | [g] 15 | | 0.31 | 314,000 | 5,840 | 17 | 8.58 |
| 7 | 85 | [h] 11.3 | 3.7 | 1.40 | 363,000 | 5,490 | 8 | 0.42 |

[a] Parts by weight.
[b] A styrene/butadiene/caprolactone (25/50/25) block polymer.
[c] Solprene 406, a butadiene/stryene (60/40) block polymer having about 35% block styrene content.
[d] Solprene* 408, a butadiene/styrene (70/30) block polymer.
[e] A styrene/butadiene/caprolactone (47.5/27.5/25) block polymer.
[f] Solprene* 407, a butadiene/styrene (36/65) block polymer.
[g] A butadiene/caprolactone (75/25) block polymer.
[h] Solprene* 200, a polybutadiene.
[i] Prepared by polymerization of ε-caprolactone in cyclohexane with n-butyllithium, mw about 50,000.
[j] See footnote a, Table I.
*Trademark.

NOTE.—0.1 parts by weight of Dicup employed in all blends.

The above example clearly demonstrates the tremendous improvements in impact strength imparted to the styrene/acrylonitrile copolymer when blended with a block copolymer containing the lactone according to this invention.

TABLE I

| Run number | SAN,[a] parts [c] | Lactone polymer,[b] parts [c] | Rubber, parts [c] | Replacement, percent [d] | Melt flow,[h] g./10 min. | Flexural [i] modulus, p.s.i. | Tensile,[j] p.s.i. | Elongation, percent [k] | Izod impact, [l] ft.-lb./inch notch |
|---|---|---|---|---|---|---|---|---|---|
| 1 | 77.5 | 22.5 | | 0 | 0.21 | 297,000 | 5,250 | 54 | 11.62 |
| 2 | 78.1 | 20.2 | Solprene* 2000 [e] 1.7 | 10 | 0.19 | 300,000 | 5,040 | 59 | 11.93 |
| 3 | 78.9 | 16.9 | do 4.2 | 25 | 0.19 | 289,000 | 5,160 | 92 | 12.25 |
| 4 | 80.3 | 11.3 | do 8.4 | 50 | 0.24 | 311,000 | 5,100 | 65 | 7.67 |
| 5 | 81.7 | 5.6 | do 12.7 | 75 | 0.44 | 320,000 | 4,640 | 20 | 1.39 |
| 6 | 83.1 | 0 | do 16.9 | 100 | 0.76 | 322,000 | 4,700 | 3 | 0.37 |
| 7 | 77.5 | 20.2 | Solprene* 1205 [f] 2.3 | 10 | 0.20 | 283,000 | 5,050 | 27 | 10.25 |
| 8 | do | 16.9 | do 5.6 | 25 | 0.20 | 292,000 | 5,120 | 45 | 12.18 |
| 9 | do | 11.3 | do 11.2 | 50 | 0.33 | 289,000 | 4,180 | 89 | 8.20 |
| 10 | do | 5.6 | do 16.9 | 75 | 0.37 | 287,000 | 4,160 | 30 | 1.66 |
| 11 | do | 0 | do 22.5 | 100 | 0.91 | 286,000 | 4,380 | 10 | 0.33 |
| 12 | 74.8 | 20.2 | Solprene* 407 [g] 5.0 | 10 | 0.17 | 274,000 | 4,890 | 33 | 11.90 |
| 13 | 71.1 | 16.9 | do 12.0 | 25 | 0.16 | 260,000 | 4,710 | 66 | 12.32 |
| 14 | 64.7 | 11.3 | do 24.0 | 50 | 0.19 | 240,000 | 4,100 | 63 | 2.60 |
| 15 | 58.1 | 5.6 | do 36.3 | 75 | 0.32 | 241,000 | 3,860 | 24 | 1.37 |
| 16 | 51.6 | 0 | do 48.4 | 100 | 0.58 | 222,000 | 3,350 | 10 | 60 |

[a] Tyril 767, a styrene/acrylonitrile (77/23) copolymer made by Dow Chemical Co., Izod impact lb./in. notch 0.26.
[b] A styrene/butadiene/caprolactone (25/50/25) block copolymer, having a Mooney viscosity (MS-4 at 270° F.) of 82.
[c] Parts by weight.
[d] The amount (percent) of the styrene/butadiene/lactone polymer replaced by the rubber.
[e] A polybutadiene having a Mooney viscosity (ML-4 at 212° F.) of 40-50 made by Phillips Petroleum Company.
[f] A butadiene/styrene (75/25) block copolymer having a block polystyrene content of about 18% and a Mooney viscosity (ML-4 at 212° F.) of 42-52 made by Phillips.
[g] A butadiene/styrene (35/65) copolymer having a block polystyrene content of about 50%.
[h] ASTM D-1238-62T (200° C., 5,000 gram load).
[i] ASTM D-790-63.
[j] ASTM D-638-61T at 0.2 inch/minute drawing rate.
[k] ASTM D-638-61T as in (j).
[l] ASTM D-256-56 (73° F., ⅛-inch sample thickness).
*Trademark.

EXAMPLE III

Blends of styrene/butadiene/ε-caprolactone (25/50/25) block copolymer with a styrene/acrylonitrile (77/23) copolymer were prepared and the properties of the blends determined as in Example I. The blend recipes and results are reported in Table III.

The results reported in Table III demonstrate that the blends of this invention have a good balance of properties and display a tremendous improvement in the impact strength of the styrene/acrylonitrile copolymers.

EXAMPLE IV

Blends were made according to the process employed in Example I by blending the lactone containing block copolymer of this invention with various resinous polymers to demonstrate that the high impact strengths imparted to styrene/acrylonitrile copolymers according to this invention are not realized with other resinous polymers such as polystyrene and polymethylmethacrylate. The mutual solubility between styrene/acrylonitrile copolymers and the lactone containing block copolymers is believed to be a principal factor in achieving this realization.

The blend compositions and properties of the blends are reported in Table IV. All of the blends contained 0.1 weight percent by weight of bis (α,α-dimethylbenzyl) peroxide. The polymer components are reported as parts by weight of the total blend in Table IV.

EXAMPLE V

Dynamic modulus data were obtained on (A) polycaprolactone, (B) styrene/acrylonitrile (77/23) copolymer, (C) blends of (A) and (B) above and (D) blends of (B) with butadiene/caprolactone block copolymer. Dynamic storage and loss modulus vs. temperture curves were obtained on the above materials using a Vibron Dynamic Viscoelastometer.

The results of these determinations were as follows: Material (A) polycaprolactone — showed two transition regions, glass transition at — 40° C. and a crystalline melting region; Material (B) — styrene/acrylonitrile copolymer — showed only a glassy transition at 104° C.; Material (C) — blends of (A) and (B) — showed only glassy transition with the position (temperature) of the loss modulus maximum varying with blend composition. It was noted that a plot of 1/Tmax vs. blend composition was linear for these blends which is a characteristic of random copolymer Tg values in terms of Tg of the homopolymers; Material (D) — blends of (B) with butadiene/caprolactone block copolymer — showed a polybutadiene transition at −70° to −80° C. and a double peak in the storage modulus for caprolactone - styrene/acrylonitrile phase. One of the peaks is the glassy transition peak seen in Material (C) while the second is believed to be due to chain entanglements. Again, as in (C), no sign of the polycaprolactone (A) transitions were seen in these blends.

The above results demonstrate that the polycaprolactone (A) and styrene/acrylonitrile (B) form a homogeneous solid solution. It is further demonstrated that blends of the butadiene/caprolactone block copolymer with styrene/acrylonitrile copolymer then are represented as particles of polybutadiene dispersed in the polycaprolactone block-styrene/acrylonitrile solid solution.

TABLE III

| Blend recipe: | | | | | | | | Parts by weight |
|---|---|---|---|---|---|---|---|---|
| (BSC) Butadiene/styrene/epsilon caprolactone (50/25/25) polymer (g.) | | | | | | | | Variable. |
| (SBC) Styrene/butadiene/epsilon caprolactone (25/50/25) polymer (a.) | | | | | | | | Do. |
| (SAN) Styrene/acrylonitrile (77/23) polymer | | | | | | | | Do. |
| (Dicup) bis(α, α-dimethylbenzyl) peroxide | | | | | | | | Do. |

| | Results | | | | | | | |
|---|---|---|---|---|---|---|---|---|
| Run No. | SBC or BSC, parts by weight | (SAN)[h] parts by weight | (Dicup) parts by weight | Tensile, p.s.i.[b] | Elongation, percent[c] | Flexural modulus, p.s.i.[d] | Melt flow, g./10 min.[e] | Izod impact, ft. Lb./in. notch[f] |
| 1 | | 100 | | 9,870 | 4 | 524,000 | 1.80 | 0.26 |
| 2 | a 37.5 | 62.5 | | 2,870 | 35 | 189,000 | 1.32 | 11.79 |
| 3 | a 37.5 | 62.5 | 0.1 | 3,160 | 42 | 219,000 | 0.52 | 10.38 |
| 4 | a 30.0 | 70.0 | 0.1 | 4,060 | 71 | 238,000 | 0.33 | 11.73 |
| 5 | a 22.5 | 77.5 | 0.1 | 5,100 | 41 | 294,000 | 0.45 | 10.00 |
| 6 | g 37.5 | 62.5 | 0.1 | 2,570 | 6 | 195,000 | 0.38 | 2.31 | a Polymer having an inherent viscosity of 1.34 determined in chloroform using procedure of U.S. 3,078,254, col. 10, lines 13-32.
b ASTM D-638-61T at 0.2 inches/minute drawing rate.
c ASTM D-638-61T as in b.
d ASTM D-790-63.
e ASTM D-1238-62T (200° C., 5,000 gram load).
f ASTM D-256-56 (73° F., ⅛ inch sample thickness).
g Polymer having an inherent viscosity of 0.91 in chloroform as determined in a.
h See footnote a, Table I.

TABLE IV

| Run number | SBC, parts[a] | SAN, parts[b] | Polystyrene, parts[d] | Polymethylmethacrylate, parts[e] | Tensile, p.s.i.[c] | Elongation,[c] percent | Izod[c] impact ft. lb./in. |
|---|---|---|---|---|---|---|---|
| 1 | 37.5 | 62.5 | | | 3,160 | 42 | 10.4 |
| 2 | 37.5 | | 62.5 | | 2,520 | 25 | 1.3 |
| 3 | 37.5 | | | 62.5 | 2,830 | 12 | 0.7 |
| 4 | | | 100 | | 5,440 | 2 | 0.26 |
| 5 | | | | 100 | 9,200 | 8 | 0.12 | a Styrene/butadiene/caprolactone (25/50/25), see footnote b, Table I.
b Styrene/acrylonitrile (77/23), see footnote a, Table I.
c As reported in footnotes, Table I.
d Cosden 550 made by Cosden Oil and Chemical Co.
e Plexiglass V-100 made by Rohm and Haas Co.

EXAMPLE VI

Blends were prepared according to the blending procedures employed in Example I. The blend compositions are reported in Table V. The properties of the various blends employed in Table V are reported in Table VI.

TABLE V

| Run number | 1 | 2 | 3 | 4 | 5 | 6 |
|---|---|---|---|---|---|---|
| Recipe: | | | | | | |
| Styrene/acrylonitrile [a] | 40 | 40 | 40 | 40 | | 70 |
| Polycarbonate [b] | 50 | 50 | 50 | 50 | 50 | |
| Styrene/butadiene/caprolactone [c] | 10 | | | | 10 | 10 |
| Butadiene/caprolactone [d] | | 10 | | | | |
| Solprene* 200 [e] | | | 10 | | | |
| Solprene* 1205 [f] | | | | 7.5 | | 20 |
| Polycaprolactone [g] | | | | 2.5 | | |
| Polystyrene [h] | | | | | 40 | |

[a] As reported in footnote a, Table I.
[b] Lexan Polycarbonate 101 made by General Electric Corporation (Bisphenol-A and phosphene reaction product).
[c] As reported in footnote a, Table II.
[d] As reported in footnote g, Table II.
[e] As reported in footnote h, Table II.
[f] As reported in footnote f, Table I.
[g] As reported in footnote j, Table II.
[h] As reported in footnote d, Table IV.

*Trademark

TABLE VI

| Run No. | Tensile psi(a) | Elongation(a) % | Flexural Modulus, psi(2) | Izod(a) Impact, ft lb/inch notch |
|---|---|---|---|---|
| 1 | 6320 | 3 | 338,000 | 2.92 |
| 2 | 6420 | 3 | 353,000 | 2.91 |
| 3 | 4540 | 3 | 364,000 | 0.28 |
| 4 | 4700 | 2 | 388,000 | 0.39 |
| 5 | 4050 | 3 | 328,000 | 0.29 |
| 6 | 3200 | 31 | 238,000 | 1.76 |

(a) Determined as reported in Table I.

The data reported in Table VI demonstrate the blends of styrene/acrylonitrile copolymers and the lactone containing block copolymer can be admixed with other resins such as polycarbonates and still maintain high impact strength that are imparted to the styrene/acrylonitrile copolymers according to this invention, as demonstrated in Runs 1 and 2. Substitution of a polybutadiene rubber, or a butadiene/styrene block copolymer and a homopolymer of a lactone, for the lactone containing block copolymer of this invention, represented in Runs 3 and 4 were contrarily ineffective for imparting the high impact strengths to the styrene/acrylonitrile copolymer. Substitution of polystyrene for the styrene/acrylonitrile copolymer employed according to this invention is likewise ineffective as demonstrated by Run 5. Run 6 clearly demonstrates that a rubber can also be blended with the blend composite of this invention.

EXAMPLE VII

Blends were prepared according to the blending procedures employed in Example I for the purpose of producing an essentially transparent composition. In these runs styrene/butadiene/caprolactone (S/B/C) block copolymers of varying composition were blended with a styrene/acrylonitrile (77/23) copolymer (SAN) in varying ratios. Refractive indices (R.I.) were calculated for the lactone block polymer, for the continuous phase assuming the caprolactone block formed a solution with the SAN in this phase, and for the dispersed phase, styrene/butadiene portion of the lactone-containing block copolymer, assuming in each case a linear relation between composition and refractive index based on the refractive indices of the respective homopolymers. The blend compositions are shown below in Table VII and the properties of the blends shown in Table VIII.

TABLE VII

| Run No. | (S/B/C) Composition | Calculated R.I.s(a) (S/B/C) | Calculated R.I.s(a) (C+SAN) | S/B | Blend Ratio(b) SAN/(S/B/C) |
|---|---|---|---|---|---|
| 1 | 25/50/25 | 1.529 | 1.575 | 1.545 | 82/18 |
| 2 | 32.5/42.5/25 | 1.535 | — | — | 48.2/21.8 |
| 3 | 37.5/37.5/25 | 1.539 | 1.572 | 1.559 | 76/24 |
| 4 | 42.5/32.5/25 | 1.543 | — | — | 72.3/27.7 |
| 5 | 47.5/27.5/25 | 1.547 | — | 1.569 | 67.3/32.7 |
| 6 | 50/25/25 | 1.550 | 1.567 | 1.573 | 64/36 |

(a) Calculations based on the following values for the respective homopolymers of copolymer:

| polystyrene | 1.600 |
| polybutadiene | 1.518 |
| polyacrylonitrile | 1.519 |
| polycaprolactone | 1.480 |
| poly(styrene/acrylonitrile) | 1.580 |

(b) All blends contained 9 weight percent polybutadiene.

TABLE VIII

| Run No. | Haze,[a] percent | Melt flow,[b] g./10 min. | Modulus,[b] p.s.i.×10⁻³ | Tensile,[b] p.s.i. | Elongation,[b] percent | Izod impact,[b] ft.-lb./in. notch |
|---|---|---|---|---|---|---|
| 1 | 47 | 0.32 | 330 | 5,910 | 50 | 6.6 |
| 2 | 31 | 0.33 | 310 | 5,290 | 67 | 11.9 |
| 3 | 27 | 0.29 | 310 | 5,290 | 93 | 7.4 |
| 4 | 14 | 0.21 | 305 | 5,170 | 75 | 6.7 |
| 5 | 5 | 0.15 | 295 | 4,880 | 45 | 7.5 |
| 6 | 5 | 0.09 | 275 | 4,640 | 42 | 2.3 |

[a] ASTM D 1003-52.
[b] Determined as reported in Table I.

The results in Tables VII and VIII demonstrate that by proper selection of the blend components and blend ratios, compositions possessing very good physical properties such as impact strength as well as high transparency can be prepared according to this invention. Run No. 5 above is an outstanding example of a composition of this type.

As will be evident to those skilled in the art, various modifciations of this invention can be made or followed in light of the discussion and disclosure herein set forth without departing from the scope or the spirit thereof.

We claim:

1. A three component composition comprising:
   a. from about 95 to 40 based on the weight of the total composition weight percent of a styrene/acrylonitrile copolymer, said copolymer containing from about 5 to 50 weight percent acrylonitrile;
   b. at least 5 based on the weight of the total composition weight percent of a conjugated diene/lactone block copolymer, said block copolymer containing from about 5 to 80 weight percent lactones; and
   c. no more than 50 weight percent based on the weight of the total composition of a rubbery polymer which is different from the copolymer of (a) or (b) or a polycarbonate which is a bisphenol-A and phosgene reaction product.

2. A composition according to claim 1 wherein said composition comprises from about 90 to 50 weight percent of said styrene/acrylonitrile copolymer, from about 5.6 to 20.2 weight percent of said conjugated diene/lactone block copolymer, and from 1.7 to 50 weight percent of said rubbery polymer or said polycarbonate.

3. A composition according to claim 1 wherein said conjugated dien/lactone block copolymer can be represented by the formula A-B, wherein A represents a block segment comprising polymerized conjugated dienes, and B represents a block comprising polymerized lactones, wherein said A block represents from about 95 to 20 weight percent of the total weight of said block copolymer and comprises homopolymer prepared from conjugated dienes, copolymers prepared from 2 or more conjugated dienes, or copolymers prepared from conjugated dienes and monovinyl-substituted aromatic hydrocarbons, and when the A block comprises a copolymer of conjugated dienes and monovinyl-substituted aromatic hydrocarbons sufficient conjugated diene monomer is employed to provide a minimum of 10 weight percent conjugated diene based on the total weight of said block copolymer; wherein said B block comprises homopolymers of lactones, or copolymers of 2 or more lactones.

4. A composition according to claim 3 wherein said styrene/acylonitrile copolymer comprises from about 15 to 40 weight percent acrylonitrile and wherein said conjugated diene/lactone block copolymer comprises from about 10 to 50 weight percent polymerized lactone based on the total weight of said conjugated diene block copolymer.

5. A composition according to claim 4 wherein said conjugated diene is butadiene, wherein said monovinyl-substituted aromatic hydrocarbons is styrene and said lactone is $\epsilon$-caprolactone.

6. A composition according to claim 1 comprising in addition a peroxy compound curing agent containing from about four to 40 carbon atoms per molecule.

7. A composition according to claim 1 wherein said rubbery polymer is a conjugated diene homopolymer or copolymer.

8. A composition according to claim 7 wherein said homopolymer is butadiene and said polymer is a butadiene/styrene copolymer.

9. A composition according to claim 1 wherein said conjugated diene/lactone block copolymer is a styrene/butadiene/caprolactone block copolymer.

* * * * *

UNITED STATES PATENT OFFICE
CERTIFICATE OF CORRECTION

Patent No. 3,789,084      Dated January 29, 1974

Inventor(s) Clifford W. Childers

It is certified that error appears in the above-identified patent and that said Letters Patent are hereby corrected as shown below:

column 14, line 15 (Claim 8) for "polymer" should read
-- copolymer --.

Signed and sealed this 10th day of September 1974.

(SEAL)
Attest:

McCOY M. GIBSON, JR.
Attesting Officer

C. MARSHALL DANN
Commissioner of Patents